United States Patent [19]

Sauerland

[11] 3,840,804
[45] Oct. 8, 1974

[54] CRYSTAL FREQUENCY MONITOR

[76] Inventor: Franz Ludwig Sauerland, 3690 Daleford Rd., Shaker Heights, Ohio 44120

[22] Filed: May 21, 1973

[21] Appl. No.: 362,179

[52] U.S. Cl. .................................. 324/56, 324/82
[51] Int. Cl. ....................... G01r 29/22, G01r 23/00
[58] Field of Search .......... 324/82, 57, 56; 29/23.35

[56] References Cited
UNITED STATES PATENTS

| | | | |
|---|---|---|---|
| 2,366,628 | 1/1945 | Koch | 324/82 |
| 3,501,695 | 3/1970 | Nasstrom | 324/82 |
| 3,510,769 | 5/1970 | Landee | 324/82 |
| 3,600,675 | 8/1971 | Grenier | 29/25.35 |

Primary Examiner—Robert I. Corcoran

[57] ABSTRACT

Apparatus for broadband measurement and automatic adjustment of piezoelectric-resonator frequencies, based upon phase comparison by means of a quadrature phase detector in an adjustable-phase transmission network.

8 Claims, 6 Drawing Figures

CRYSTAL FREQUENCY MONITOR

The invention relates generally to a frequency monitor and, more particularly, to an apparatus for broadband frequency measurement and automatic frequency adjustment of piezoelectric resonators, especially acoustically independent or acoustically coupled quartz crystal resonators.

Methods for measuring frequencies of piezoelectric resonators are usually divided into two main categories: active methods, where the resonator is the frequency determining element of an oscillator, and passive methods, where the resonator is excited by an external variable frequency source. The latter category contains bridge methods and transmission methods.

Oscillator methods have measurement errors due to circuit reactances, and they have a limited frequency range and Q range. Conventional transmission methods are based on detecting voltage peaks and incur errors due to flat response maxima. Bridge methods are accurate, but they are cumbersome and therefore not suitable for fast measurements.

Recently there has been a significant improvement in the accuracy and speed of measuring frequency, utilizing a transmission method which is based upon a determination of the series resonant frequency as the frequency of zero phase across the resonator. The method can be used over a frequency range of more than 200 MHz. It has been described in publications such as "Technique for Crystal Resonance Measurements Based on Phase Detection in a Transmission Type Measurement System" by R. P. Grenier, Proc. Frequency Control Symposium 1968, and "On Precision Measurements of Frequency and Resistance of Quartz Crystal Units" by C. Franx, Proc. Frequency Control Symposium 1969. Because of its advantages, this phase detection transmission measurement has been suggested as an international measurement standard. One remaining drawback is the relative complexity and cost of the equipment used to implement this approach.

Also known is a frequency discriminator circuit, for example, see U.S. Pat. No. 3,510,769, in which the signal from a variable-frequency source is applied to two channels that both lead to a quadrature phase detector. One of the channels contains a piezoelectric resonator whose resonance frequency is to be measured, while the other channel contains a phase shifter that is adjustable such that at the resonance frequency the phase between the two signals applied to the detector is 90°. The phase shift across the resonator is zero at its resonance frequency and changes steeply with small deviations from the resonance frequency. The phase detector provides a dc output voltage that is proportional to small deviations from phase quadrature and indicates resonance by zero output.

Various conventional means for phase shifting can be used in this circuit. Among them are lumped LC networks, delay lines, and matched fractional-wavelength transmission lines. None of these methods offer a convenient and economical way of continuous phase adjustment over a wide frequency range. It appears to be for this reason that frequency discriminator circuits of the type described above are not utilized for large bandwidth applications and that instead the more complex and costly methods described in the referenced literature are in widespread use.

The present invention provides for continuous phase adjustment over a frequency range of more than 200 MHz in a convenient and economical way that is applicable to the abovementioned discriminator circuit. The invention bases on the strong phase dependence of a mismatched, low-loss, transmission line on its load impedance.

It is therefore the primary objective of the present invention to provide a phase detection transmission measurement system that is sufficiently broadband to cover the frequency range for AT cut quartz crystal resonators (from about 1 to over 200 MHz), is significantly simpler and more economical than prior art devices, and that offers the additional and often more important function of automatically processing a resonator frequency to a comparable degree of accuracy with which it is to be measured.

For a better understanding of the present invention, together with other and further objects thereof, reference is had to the following description taken in connection with the accompanying drawings, and its scope will be pointed out in the appended claims.

Figure 1:
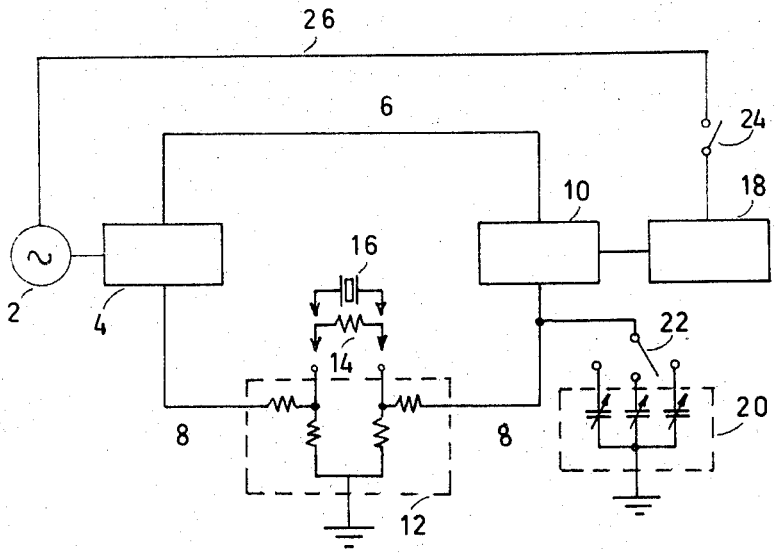
FIG. 1 is an electrical block diagram of a circuit according to the present invention.

Referring to FIG. 1, there is shown a circuit according to the invention. A signal from a variable-frequency source 2 is divided by a signal splitter 4 into two signals of equal phase on channels 6 and 8. Channel 6 is directly connected to one input of a quadrature phase detector 10. Channel 8 connects the other output of the signal splitter with the other input of the phase detector via the transmission network 12. This is a resistive ladder network with provisions for alternately connecting a substitution resistor 14 and the resonator 16 that is to be measured or processed. A set of variable capacitors 20 is connected via a selector switch 22 to the channel 8 input of detector 10. The output of the phase detector is connected to a utilization circuit 18 which in turn is connectable to signal generator 2 via switch 24 and feedback line 26.

The operation of the circuit FIG. 1 is similar to that of the abovementioned frequency discriminator and will be described later. The novelty lies in the means for adjusting the phase between the two detector inputs to 90° while covering a large frequency spectrum.

Figure 2:
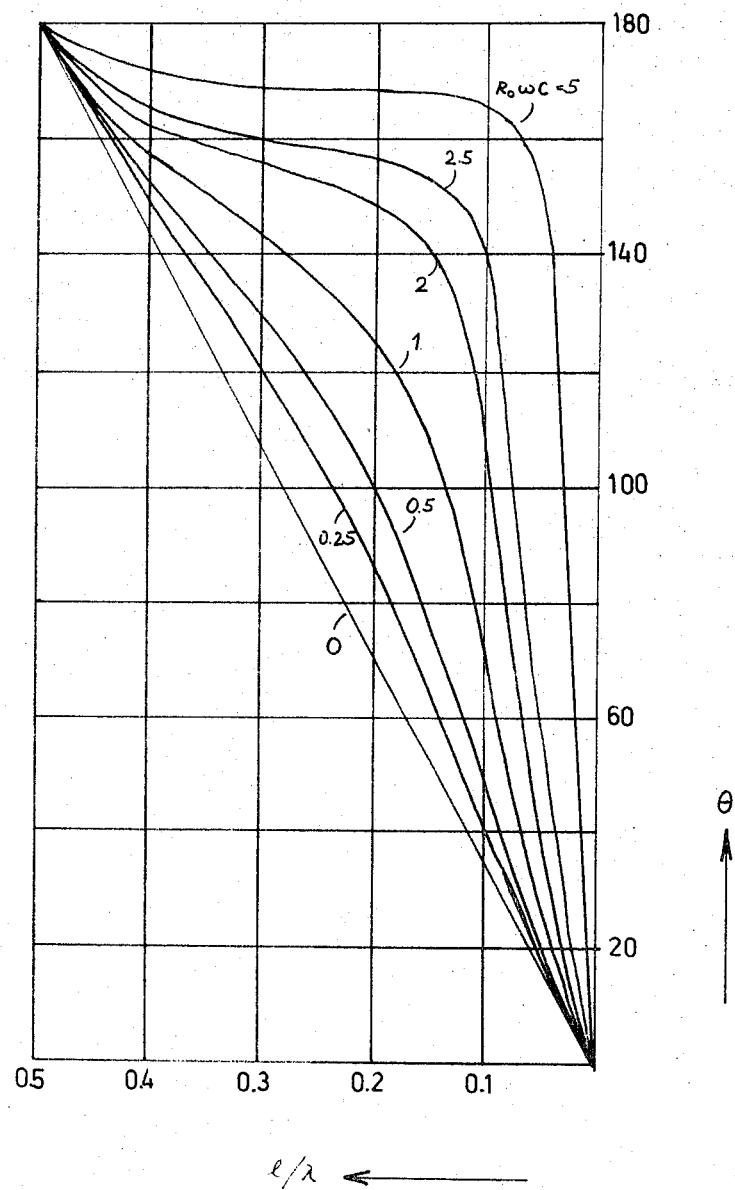
FIG. 2 is a plot of the phase angles between voltages along the length of a lossless transmission line that is terminated in different load impedances.

If a lossless transmission line is terminated in a complex impedance $Z = 1/(R_o - j/\omega C)$, the phase angle $\theta$ between the voltage at the load and at a distance $l$ away from the load is $$\theta = \tan^{-1} 1/\cot\beta l - R_o \omega C$$

where $\omega = 2\pi f$, $f =$ operating frequency, $R_o =$ characteristic impedance, and $\beta = 2\pi/\lambda$ = propagation constant of a lossless transmission line that has a wave length of $\lambda$. The equation can be derived from the elementary transmission line equations. FIG. 2 shows a plot of $\theta$ versus $l/\lambda$ for various load conditions. Since the performance is periodic in $\lambda/2$, the plot covers only a half-wave transmission line.

The case $R_o\omega C = 0$ corresponds to the transmission line being terminated in its characteristic impedance $R_o$, with the phase changing uniformly at a rate of 90° per quarter wavelength. The other curves show the effect of various complex load conditions. For example, if the impedance ratio $R_o\omega C$ is allowed to vary between 0.25 and 2.5, the arrangement can simulate the 90° phase performance of an adjustable matched $\lambda/4$ line while the actual line length is between 0.21 $\lambda$ and 0.07 $\lambda$. Because of the periodicity in $\lambda/2$, one can also obtain $(90 + n\ 180)$ degrees phase shift with line lengths between $(0.21 + n/2)\lambda$ and $(0.07 + n/2)\lambda$, where $n$ is an integer.

Conversely, one can vary the phase shift across any given cable length. According to FIG. 2 one can, for example, change the phase shift across a cable length of 0.1 $\lambda$ by approximately 100° by varying $R_o\omega C$ between 0.25 to 2.5.

A similar behavior can be observed if the load impedance has an inductive component.

The described phase shift method is implemented in the circuit of FIG. 1. Channel 8 comprises a transmission line. In one form of the invention, the detector input impedance is made substantially equal to the characteristic impedance of the transmission line. In conjunction with the variable capacitors 20 it provides a variable complex impedance termination for the channel 8 transmission line and thereby a phase variation similar to that of FIG. 2.

In one realized form of the invention the variable capacitors 20 are dimensioned such that they provide a variable phase change of approximately 65° in 3 frequency ranges. In conjunction with changing the length of the channel 8 cable connection in steps of 10 inches or more, this allows continuous phase adjustment over a spectrum of more than 200 MHz.

Figure 3:
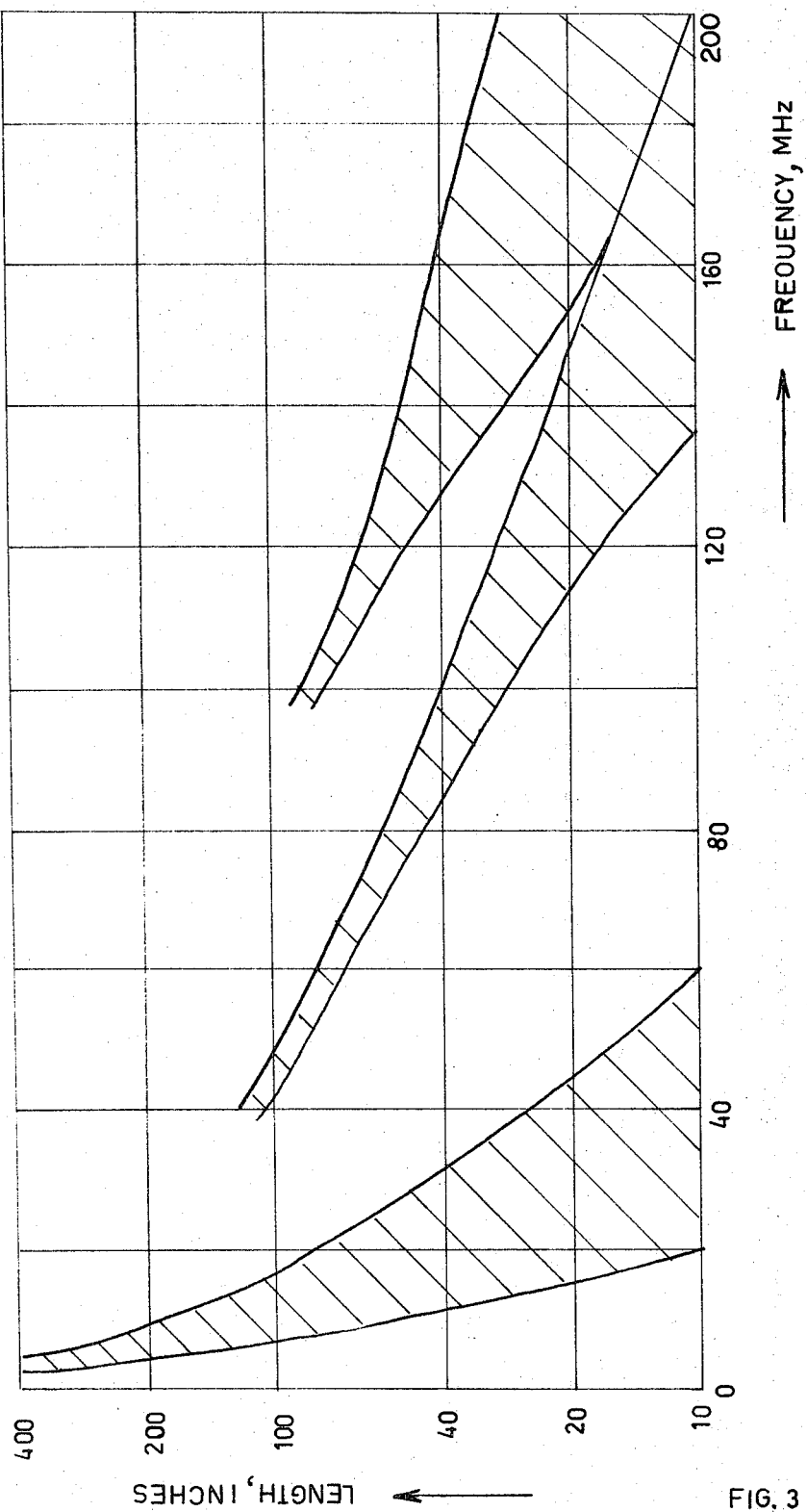
FIG. 3 is a plot of cable length versus operating frequency for a system according to the invention.

The limits for the channel 8 cable length are illustrated in FIG. 3 for a realized instrument according to the invention. In this figure, the length $L$ of the (RG 58A/U) coaxial cable connecting the instrument terminals to the transmission network is plotted versus the operating frequency. The shaded areas correspond to the operating ranges.

Figure 4:
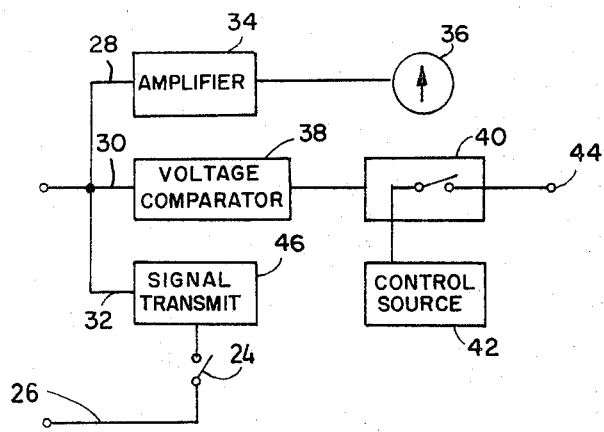
FIG. 4 is an electrical block diagram of a utilization circuit employed in the circuit of FIG. 1.

FIG. 4 shows a block diagram of one form of the utilization circuit 18 indicated in FIG. 1. This circuit provides visual indication, switching action and signal processing for the detector output voltage. The output of the phase detector is connected to the 3 channels 28, 30, and 32. Channel 28 is applied to a center-zero meter 36 via an amplifier 34 whose response is linear for small signals and becomes logarithmic for large signals, thereby providing a wide dynamic range for the meter response and at the same time high sensitivity in the vicinity of zero signal. Channel 30 is applied to a voltage comparator 38 which is applied to an electronically triggered switching circuit 40 that connects or disconnects an electric power supply to terminal 44. Channel 32 contains the network 46 which serves to process the detector output voltage such that it can be used for phase locking the signal generator. Network 46 comprises an amplifier and a low pass filter, which are the two conventional building blocks in the feedback path of a phase locked loop.

In order to use the system of FIG. 1 for frequency measurement, a substitution resistor 14, representing zero phase, is first placed in the transmission network 12. With the signal frequency set in the vicinity of the resonant frequency, the phase shifter is adjusted such that the phase detector output voltage is zero, as indicated by the meter reading. Then the substitution resistor is replaced by the resonator 16, and the signal frequency is adjusted until the detector output is zero again. At this point the phase across the resonator is zero, and the signal frequency coincides with the resonator frequency.

If the frequency of the signal source is voltage controllable, the measurement may be automated by phase locking the signal frequency to the resonator frequency. This can be done by connecting the detector output to the signal source by way of switch 24 and line 26 of FIG. 1.

In order to use the system for automatic frequency adjustment of resonators, the signal frequency is set to the desired resonator frequency and the detector output is set to zero, using a substitution resistor and the phase shifter. Then the substitution resistor is replaced by the resonator, and the frequency adjustment process is started. This process usually comprises decreasing or increasing the resonator electrode mass, for example, by vacuum metallization. When the resonator reaches the preset frequency, the phase detector output voltage becomes zero, and the power supply 42 of FIG. 4 is switched to terminal 44, from where it can be applied to automatically terminate the adjustment process. One way of terminating vacuum metallization is to connect the power supply to a solenoid-operated shutter (not shown) which is actuated to shield the resonator from the metalization source when the correct frequency has been reached.

Sometimes it is desirable to affect the resonator adjustment process before the resonant frequency has been reached. For example, one may want to deposit resonator electrodes at a fast rate up to a point close to the final frequency and reduce the deposition rate at this point to improve the accuracy of the final frequency adjustment. This can be implemented in various ways, for example, by offsetting the voltage comparator 38 of FIG. 4 to trigger at a given nonzero phase angle. Another method comprises a signal source whose frequency can be programmed and switched automatically to a second target frequency once a first target frequency has been reached by the resonator and sensed by the phase detector.

Figure 5:
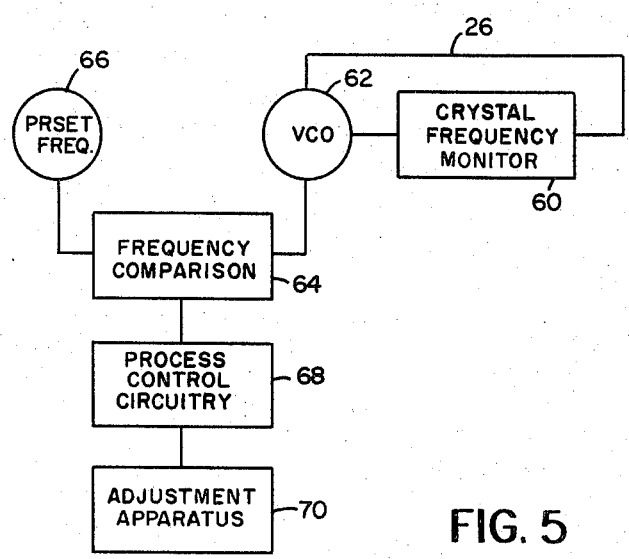
FIG. 5 is an electrical block diagram of a circuit utilizing the present invention in a phase locked loop for purposes of affecting the frequency adjustment process of resonators.

A third method bases on phase locking the resonator frequency and signal frequency and providing switching action upon reaching a preset frequency. This can, for example, be accomplished by monitoring the frequency with a counter and comparing its digital output to a preset frequency by means of a digital deviation calculator. One way of realizing such a system is illustrated in FIG. 5, with the Crystal Frequency Monitor 60 (as exemplified by FIG. 1) phase locked via line 26 to a voltage controlled oscillator (VCO) 62 whose frequency is compared by the frequency comparison circuit 64 to the preset frequency of circuit 66. When the two frequencies are equal, the process control circuitry 68 is actuated to terminate the adjustment process of the resonator which is contained in the adjustment apparatus 70.

The invention encompasses various modifications of the system of FIG. 1. For example, the variable capacitors may be connected to channel 6 rather than to channel 8; the transmission lines may be complemented by distributed or lumped reactances other than variable capacitors; the transmission network 12 may have different forms, as long as it performs its functions of reducing unwanted reflections between load and source and of matching the crystal impedance to the transmission line impedance; further, the signal splitter of FIG. 1 may be replaced by a quadrature signal splitter that provides channels 6 and 8 with input signals that are 90° out of phase with respect to each other. In this case, the relative phase shift along channels 6 and 8 must be zero, and theoretically the phase adjustment provided by the present invention would not be required. In actual broadband systems, however, some continuous phase adjustment is necessary. This can be provided by the method according to the present invention.

The use of the unmatched transmission line entails reflections at the load which affect the accuracy of the frequency measurement. However, the effect is small because the phase change $\Delta\theta/\Delta f$ of quartz resonators in the vicinity of their resonant frequency is very steep. In the circuit of FIG. 1 it is approximately $$\Delta\theta/\Delta f = 2\ Q_{eff}/f_r$$

where $f_r$ is the resonance frequency and $Q_{eff}$ is the effective quality factor of the resonator in the circuit of FIG. 1. For a typical value of $Q_{eff} = 30\ 000$, a phase error of 0.3 degrees causes a frequency error of less than 0.00001 percent. It was found experimentally that if the substitution resistor is within ± 50 percent of the equivalent series resistance of the resonator, a realized system according to the invention showed a total frequency error of typically less than 0.00002 percent.

The steepness of the phase slope at zero-phase crossing can be used as an indication for the value of the equivalent series resistance R of the resonator. In the above formula, $$Q_{eff} = 1/2\pi f_r C_1(R+R_1+R_2)$$

where $C_1$ is the dynamic resonator capacitance, and $R_1$ and $R_2$ are the two shunt resistors adjacent to the resonator in the transmission network 12 of FIG. 1. From the two preceding formulas one may solve for R in terms of the phase slope $\Delta\theta/\Delta f$ to obtain approximately $$R = \Delta f/\Delta\theta \pi C_1 f_r^2 - R_1 - R_2$$

Figure 6:
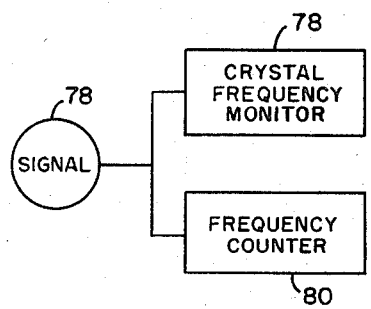
FIG. 6 is an electrical block diagram of a circuit utilizing the present invention for the purpose of determining the equivalent series resistance of a resonator.

One way of realizing a system for measuring the phase slope $\Delta\theta/\Delta f$ and thereby the resonator's equivalent series resistance is illustrated in FIG. 6, with the signal generator 76 feeding the Crystal Frequency Monitor 78 (as exemplified by FIG. 1). The Crystal Frequency Monitor has a voltmeter (number 36 in FIG. 4) whose deflection for small phase angles is proportional to the phase angle and which, if calibrated in degrees, will indicate the value of $\Delta\theta$. The frequency deviation $\Delta f$ is measured by the frequency counter 80.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Apparatus for determining the resonance frequency of a piezoelectric resonator comprising:
    a. a phase detector, said detector being effective to produce zero output when two coherent signals applied to its input are in quadrature;
    b. two signal paths, including a resonator in one thereof, connectable at one end for receiving a signal from an external signal source, and connected at the other end to said phase detector, said signal paths comprising transmission lines having a net length difference of less than $(1/4 + n/2)\lambda$ and more than approximately $(0.005 + n/2)\lambda$ between the two signal paths, where $\lambda$ is the wavelength and n any number of the integer sequence 0,1,2,3,....
    c. a variable complex impedance terminating one of said transmission lines, and being effective to adjust the phase shift between the two signals applied to said phase detector to 90 degrees.

2. Apparatus according to claim 1, where said net length difference between the transmission lines forming the two signal paths is less than $\lambda/4$ and more than approximately $0.005\lambda$, where $\lambda$ is the wavelength.

3. Apparatus according to claim 1, (wherein the output of the phase detector) and signal indicator means connected to the output of said phase detector and effective to indicate the occurrance of resonance of said resonator.

4. Apparatus according to claim 1, (wherein the output of the phase detector) and voltage sensitive switching means connected to the output of said phase detector and effective to control the frequency adjustment process of said resonator.

5. Apparatus according to claim 1, wherein the frequency of said signal source is voltage controllable (and wherein a voltage proportional to the output voltage of said detector is applied), and signal transmitting means connectable between the detector output and the signal source, effective to apply a voltage proportional to the output of said detector to said signal source in order to phase lock the signal frequency to the resonator frequency.

6. Apparatus according to claim 5, (with means for providing switching action when the resonator frequency reaches a predetermined value, said switching action being effective to control the frequency adjustment process) and frequency sensitive switching means effective to sense the difference between the resonator frequency and a preset target frequency and to terminate a resonator frequency adjustment process when said frequency difference is zero.

7. Apparatus according to claim 1 (wherein the output of the phase detector is effective to provide) and voltage and frequency measuring means effective to determine the ratio of a voltage increment of the detector output to the corresponding frequency increment of the signal source, this ratio providing a measure of the equivalent series resistance of a resonator.

8. Apparatus for determining the resonance frequency of a piezoelectric resonator, comprising:
    a. a phase detector, said detector being effective to produce zero output when two coherent signals applied to its input are in quadrature;

b. a signal splitter having an input terminal and two output terminals, said input terminal being connectable to an external signal source and said output terminals being effective to provide two coherent signals 90 degrees out of phase;

c. two signal paths, including a resonator in one thereof, each said signal path being connectable at one end to one output of said signal splitter, and connected at the other end to one input of said phase detector, said signal paths comprising transmission lines and having substantially equal phase shift;

d. a variable complex impedance terminating one of said transmission lines, and being effective to adjust the phase shift between the two signals applied to said phase detector to 90°.

e. means for indicating the output voltage of said detector and for providing electrical switching action at a predetermined level of said output voltage.

* * * * *